United States Patent
Ledbetter et al.

(10) Patent No.: US 6,443,273 B1
(45) Date of Patent: Sep. 3, 2002

(54) COMPACT VIBRATION CANCELLATION DEVICE

(75) Inventors: Timothy K. Ledbetter, Euless; Brad Stamps; David Popelka, both of Colleyville; Christopher M. Bothwell, Grapevine; Michael Reaugh Smith, Colleyville, all of TX (US)

(73) Assignee: Bell Helicopter Textron, Inc., Fort Worth, TX (US)

( * ) Notice: Subject to any disclaimer, the term of this patent is extended or adjusted under 35 U.S.C. 154(b) by 0 days.

(21) Appl. No.: 09/939,127

(22) Filed: Aug. 24, 2001

(51) Int. Cl.[7] ............................. B64D 47/00; F16F 7/10
(52) U.S. Cl. ................. 188/379; 244/17.11; 244/17.27; 267/136
(58) Field of Search ................. 188/378–380; 267/136; 244/17.11–17.27; 248/550, 562, 566, 636, 638

(56) References Cited

U.S. PATENT DOCUMENTS

| | | | | |
|---|---|---|---|---|
| 989,958 | A | | 4/1911 | Frahm |
| 3,536,165 | A | * | 10/1970 | Desjardins .................. 188/380 |
| 4,365,770 | A | * | 12/1982 | Mard et al. ............... 244/17.11 |
| 4,766,984 | A | | 8/1988 | Gaffey et al. ............... 188/380 |
| 5,072,801 | A | | 12/1991 | Freymann et al. ......... 180/68.5 |
| 5,505,282 | A | | 4/1996 | Olgac ......................... 188/379 |
| 5,647,726 | A | * | 7/1997 | Sehgal et al. ............... 416/145 |
| 5,775,472 | A | * | 7/1998 | Osterberg et al. ........... 188/378 |
| 5,984,233 | A | * | 11/1999 | Snyder et al. .............. 244/119 |
| 6,009,986 | A | * | 1/2000 | Bansemir et al. ........... 188/380 |
| 6,296,093 | B1 | * | 10/2001 | Norris et al. ............... 188/378 |

* cited by examiner

*Primary Examiner*—Christopher P. Schwartz
(74) *Attorney, Agent, or Firm*—Kenneth T. Emanuelson; Sanford E. Warren, Jr.; Gardere Wynne Sewell LLP

(57) ABSTRACT

The present invention relates to an improved vibration cancellation device designed to overcome many of the shortcomings inherent in prior devices. In many embodiments, the vibration cancellation device is smaller in scale than prior designs, facilitating more versatility with respect to design options. The device of the present invention achieves a smaller size partly due to the use of suspension springs having an offset, rather than a parallel arrangement.

16 Claims, 3 Drawing Sheets

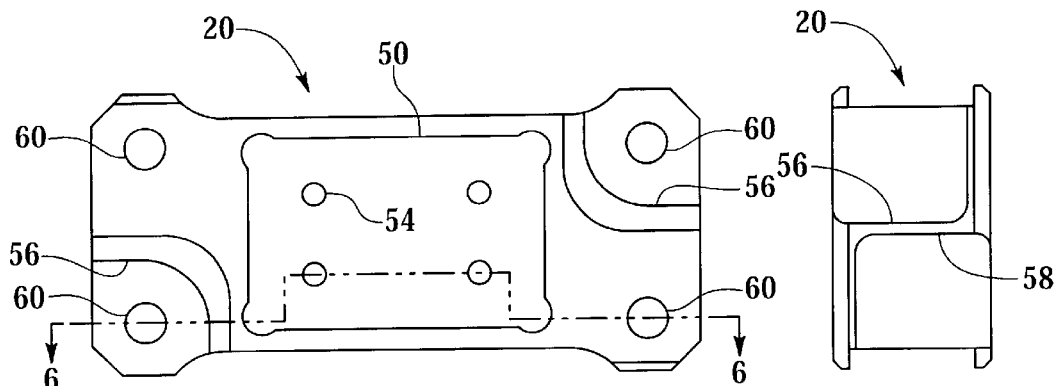
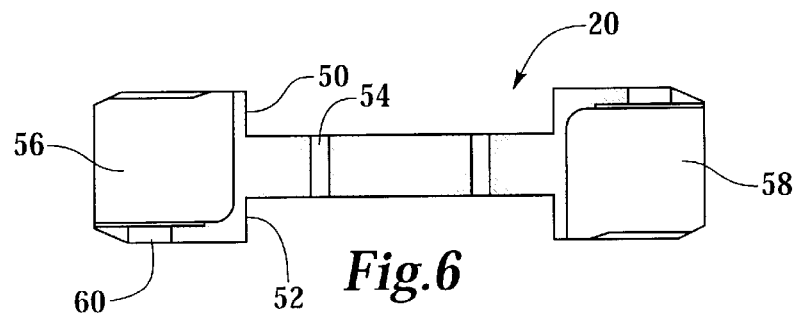
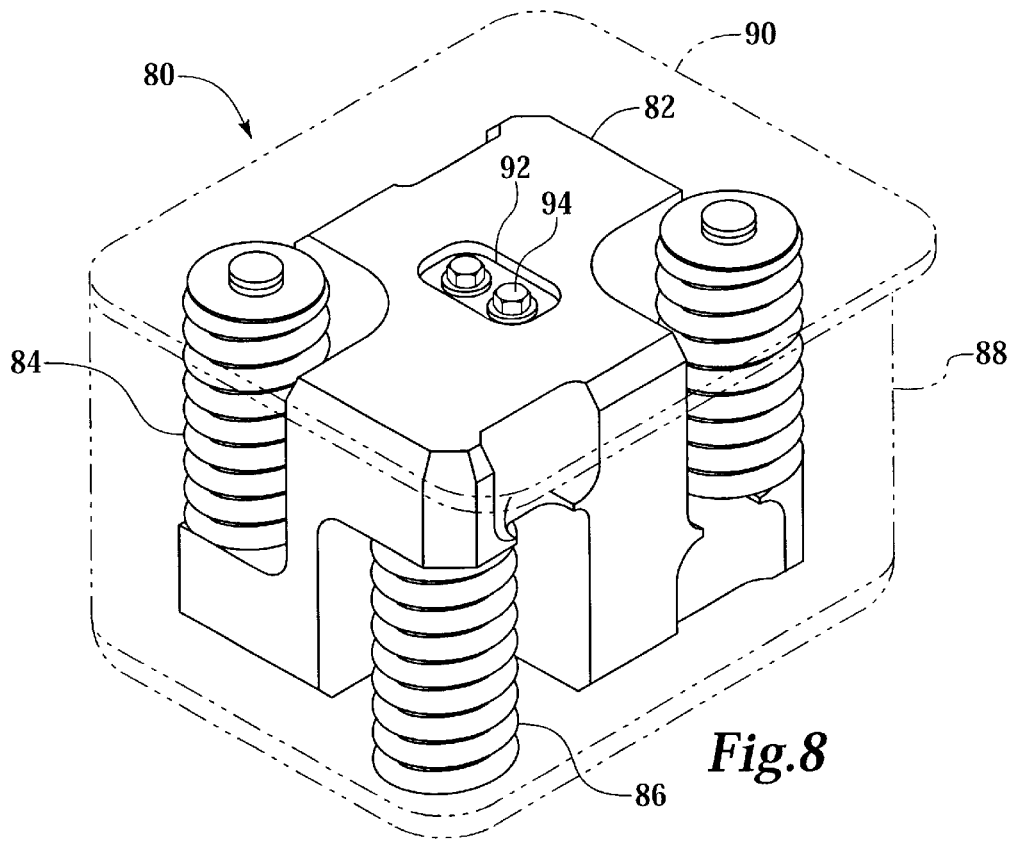

COMPACT VIBRATION CANCELLATION DEVICE

TECHNICAL FIELD OF THE INVENTION

The invention relates in general to the field of vibration cancellation and in particular to a compact assembly for cancellation of vibration in structural members.

BACKGROUND OF THE INVENTION

For many years, effort has been directed toward the design of an apparatus for attenuating or canceling vibration in structural members. Typical vibration attenuation devices employ various combinations of the mechanical system elements to adjust the frequency response characteristics of the overall system to achieve acceptable levels of vibration in the structures of interest in the system. One field in which these isolators find a great deal of use is in aircraft, wherein vibration cancellation systems are utilized to cancel mechanical vibrations which are associated with the propulsion system and which are generated by the engine, transmission, propellers, rotors, or proprotors of the aircraft.

Minimization of the length, weight and overall size of the isolation device is an important consideration in the design of an aircraft vibration cancellation system. This minimization is particularly important in the design and manufacture of helicopters, which are required to hover against the dead weight of the craft and which are in many ways more constrained in their payload than fixed wing aircraft.

A marked improvement in the field of vibration cancellation was disclosed in U.S. Pat. No. 989,958 entitled "Device for Damping Vibrations of Bodies" issued Apr. 18, 1911 to Hermann Frahm, and which is incorporated herein by reference. This patent discloses a vibration cancellation device in which an "auxiliary body" is arranged within or on the main body to counterbalance and cancel oscillating forces transmitted through the device. This device employs the principle that the acceleration of an oscillating mass is 180 degrees out of phase with its displacement to cancel the undesirable motion.

Frahm recognized that the inertial characteristics of a sprung mass could harness out-of-phase acceleration of the auxiliary body to generate counter-balancing forces to attenuate or cancel vibration in a structural member.

Within the Frahm device, the auxiliary body is excited by the vibration of the structural member to which it is attached. The auxiliary body and connecting spring in the Frahm device form a classical spring and mass assembly, the natural frequency, $\omega_n$, of which is given by:

$$\omega_n = \sqrt{k/m}$$

Where: k=the rate of the connecting spring m=the mass of the auxiliary body

The action of the Frahm device depends upon the principle that the auxiliary body will resonate at its natural frequency $\omega_n$. An attempt to excite the Frahm device by application of a vibration at the device's resonant frequency $\omega_n$ will impart high-amplitude excitation to the auxiliary body. This high-amplitude excitation of the auxiliary body will, in turn, exert a series of counter-impulses to the fixed end of the connecting spring 180 degrees out-of-phase to the vibration imparted to the Frahm device. This counter-vibration has the effect of substantially or completely canceling the imparted vibration at the resonant frequency of the device.

Although the Frahm device was a significant improvement in the art of vibration cancellation, there remains in the field a continuing demand for improvements allowing for a reduction of the size of such devices without sacrificing the ability to attenuate or cancel vibration.

SUMMARY OF THE INVENTION

The present invention disclosed herein comprises an improved vibration cancellation device designed to overcome many of the shortcomings inherent in prior devices. In many embodiments, the vibration cancellation device is smaller in scale than prior designs, facilitating more versatility with respect to design options.

One embodiment of the present invention is a vibration cancellation device incorporating an auxiliary mass having a center, a principal axis of motion, and a central plane passing through the center of mass and orthogonal to the axis of motion. This embodiment incorporates a first set of substantially planar surfaces substantially orthogonal to the axis of motion and facing in a first direction toward the central plane, as well as a second set of substantially planar surfaces substantially orthogonal to the axis of motion and facing in a second direction substantially opposite the first direction. The auxiliary mass is suspended by a first set of springs acting on the mass through the first set of surfaces and a second set of springs acting on the mass through the first set of surfaces.

A second embodiment of the present invention is a vibration cancellation device incorporating a mass having a center, an axis of motion, and a central plane passing through the center of mass and orthogonal to the axis of motion. The auxiliary mass incorporates a first set of mounting features disposed on a first set of surfaces facing in a first direction toward the central plane of the mass and a second set of mounting features disposed on a second set of surfaces facing in a second direction substantially opposite the first direction. The mass is suspended by a first set of springs acting on the mass through the first set of mounting features and a second set of springs acting on the mass through the second set of mounting features.

A third embodiment of the present invention is a vibration cancellation device comprising an auxiliary mass having a center, an axis of motion, and a first central plane passing through the center of mass and orthogonal to the axis of motion. Additionally, the auxiliary mass has a second central plane passing through the center of mass and orthogonal to the first central plane and having a first and second side and a third central plane passing through the center of mass and orthogonal to the first and second central planes and having a first and second side.

This third embodiment of the present invention uses a set of four springs to suspend the auxiliary mass, with one spring being disposed in each of the four quadrants, and the springs disposed in opposite diagonal quadrants acting together in opposition to the remaining two springs.

A fourth embodiment of the present invention is a vibration cancellation device incorporating a frame having a first and second set of spring pockets. The pockets in the first set are shaped and disposed to accept and retain a first set of springs along a first set of spring axes parallel to the axis of motion. The pockets in the second set face opposite the first set of spring pockets and are shaped and disposed to accept and retain a second set of springs along a second set of spring axes parallel to the axis of motion.

The frame is suspended by a first set of springs disposed within the first set of spring pockets and a second set of springs disposed within the second set of spring pockets. The relative positions of the pockets are defined and limited in that the first set of spring axes and the second set of spring axes are not coincident.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 5 is a top view of the suspended frame of the device shown in FIGS. 1–4; and FIG. 6 is a side cutaway view of the suspended frame of FIG. 5;

FIG. 7 is an end view of the suspended frame of FIG. 5; and

FIG. 8 is an isometric view of a second embodiment of a vibration cancellation device incorporating certain embodiments of the present invention.

DETAILED DESCRIPTION OF THE INVENTION

While the making and using of various embodiments of the present invention are discussed in detail below with reference to helicopters, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

The present invention disclosed herein comprises an improved vibration cancellation device designed to overcome many of the shortcomings inherent in prior devices. In many embodiments, the vibration cancellation device is smaller in scale than prior designs, facilitating more versatility with respect to design options.

The various embodiments of the present invention disclosed herein make use of vibration cancellation devices using offset springs. Prior art devices have made use of opposing springs having common axes to suspend the auxiliary mass within the device. It has conventionally been believed that aligned springs were necessary to provide stability to the device. The present invention represents a departure from the prior practice and conventional theory.

Figure 1:
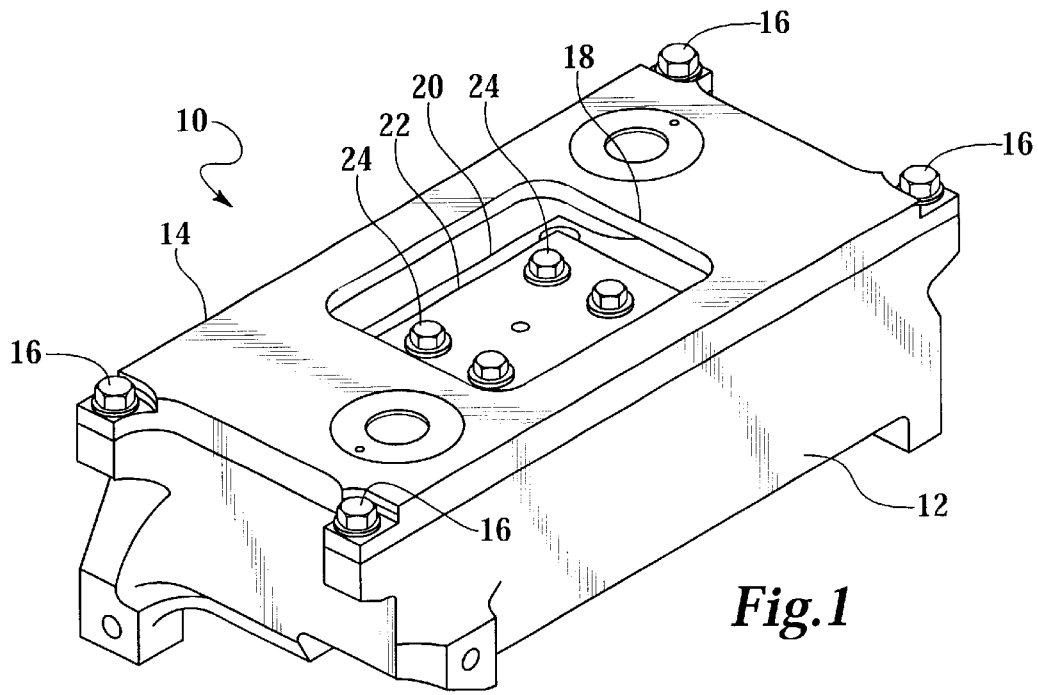
FIG. 1 is an isometric view of a vibration cancellation device incorporating certain embodiments of the present invention.
Figure 3:
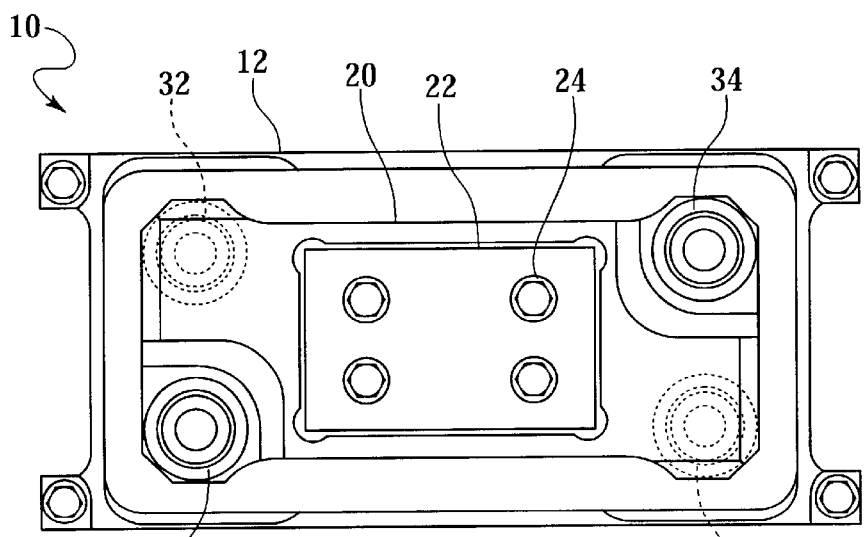
FIG. 3 is a top view of the embodiment shown in FIGS. 1 and 2 with the lid removed to reveal the internal components.
Figure 4:
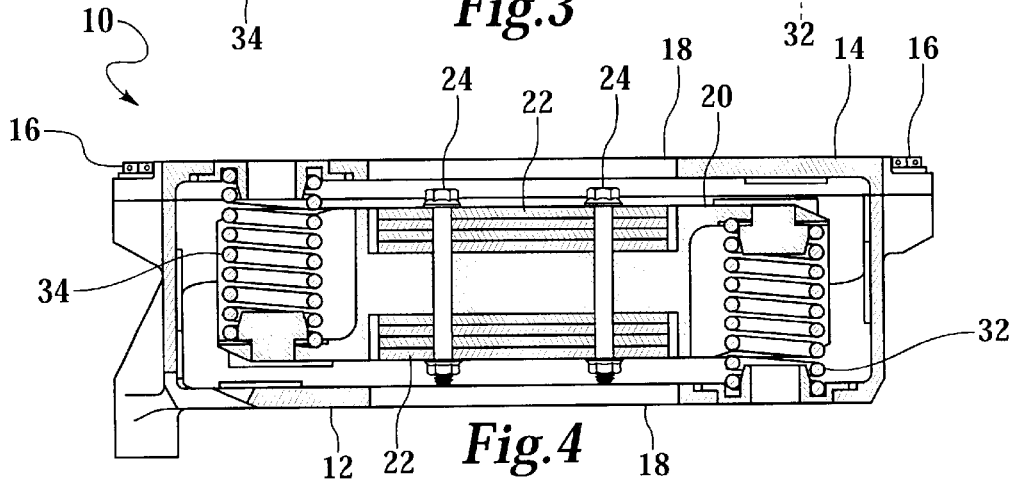
FIG. 4 is a cutaway side view of the embodiment shown in FIGS. 1–3.
Figure 2:
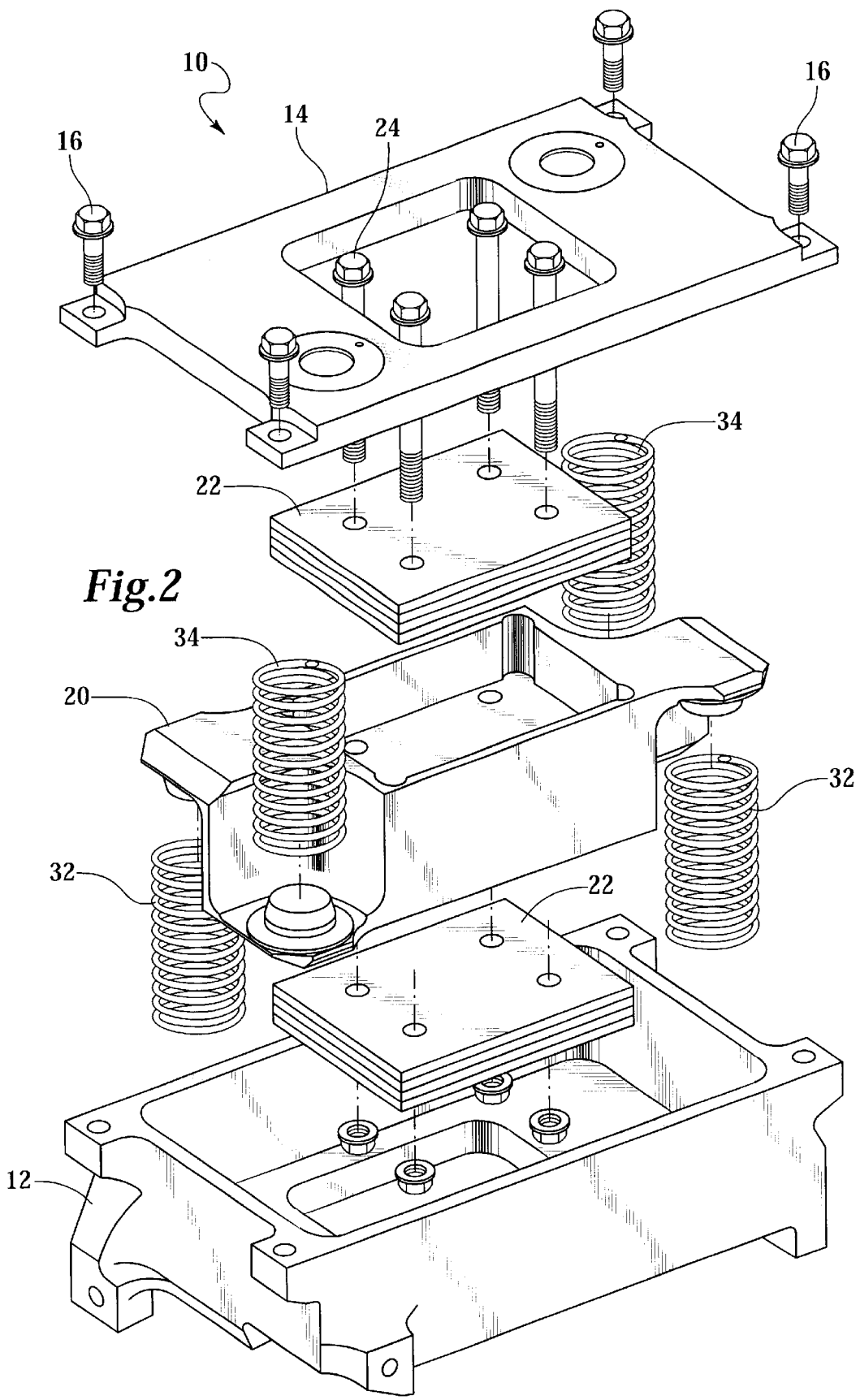
FIG. 2 is an exploded isometric view of the embodiment shown in FIG. 1.

FIGS. 1–4 depict a vibration cancellation device, or frahm 10, having a case 12 and a lid 14 secured by a set of lid fasteners 16. Although frahm 10 incorporates 4 lid fasteners 16, it will be understood by those of skill in the art that more or fewer lid fasteners 16 may be employed as requirements dictate. In the embodiment shown in FIGS. 1–4, case 12 and lid 14 incorporate windows 18 to permit access to the internal portions of frahm 10, including suspended frame 20 and tuning masses 22, which are secured to suspended frame 20 by a set of tuning mass fasteners 24. Through the proper selection of one or more tuning masses 22, it will be appreciated by those of skill in the art that the total mass of the suspended assembly, and therefore the natural frequency of the frahm 10, can be readily tuned with precision, owing to the ease of access to the tuning masses 22 through windows 18.

In the embodiment shown in FIGS. 1–4, the suspended frame 20 is suspended within the case 12 and lid 14 by two lower springs 32 and two upper springs 34. In contrast to prior vibration cancellation devices known in the art, springs 32 and 34 are disposed adjacent to, rather than in line with, the suspended assembly of the suspended frame 20, tuning masses 22, and tuning mass fasteners 24. In prior known designs, one of the more common arrangements employed paired upper and lower springs axially aligned, rather than being offset as in the present design. Such coaxial alignment has generally been thought necessary in order to provide for fully offset loading and to avoid the impartation of any dynamic moments or angular accelerations to the suspended mass.

A disadvantage inherent to prior art designs employing springs aligned in an axial arrangement is that such designs, using two springs axially aligned end-to-end must, of necessity, be approximately twice as tall as a design such as that of the embodiment shown in FIGS. 1–4, wherein the springs 32 and 34 are disposed adjacent to one another and to the suspended mass. In devices wherein the opposing springs are disposed endwise in line with and on either side of the suspended mass, the device must be even taller.

In the embodiment shown in FIGS. 1–4, it can be seen that, owing to the symmetrical nature of the design, any moment imparted to the suspended mass by any pair of offset springs 32 and 34 is counteracted by a corresponding moment in the opposite direction imparted by the remaining spring pair. Down the lengthwise axis along the longer dimension of frahm 10, for example, the moment imparted by the pair of springs 32 and 34 at one end of the device will be counteracted by the moment imparted by the pair of springs 32 and 34 at the other end, assuming the characteristics of the springs 32 and 34 are designed properly. This will be the case, for example, when the mechanical characteristics of springs 32 and 34 are identical, but designs incorporating springs having differing characteristics may be desirable in certain applications.

It will be appreciated by those of skill in the art that the natural frequency w, or peak cancellation frequency, of the frahm 10 is a function of both the spring constant k of the springs 32 and 34 and the total suspended mass including the suspended frame 20, tuning masses 22, and tuning mass fasteners 24. The natural frequency w of the frahm 10 can be increased by either increasing the stiffness of the suspending springs or lowering the mass of the suspended assembly. Conversely, the natural frequency can be lowered by either decreasing the stiffness of the suspending springs or increasing the mass of the suspended assembly.

It will be noted with reference to FIGS. 1–4 that tuning masses 22 are accessible and removable through windows 18 without disassembly of the frahm 10 itself. Accordingly, although the spring stiffness k cannot be easily changed without disassembly of the unit, the mass m can be. This allows for fine-tuning of the natural frequency w of the frahm 10 after assembly, so as to account for manufacturing tolerances or other factors. In the embodiment shown in FIGS. 1–4, the tuning masses 22 are a set of thin plates secured to the suspended frame 20 by a set of threaded tuning mass fasteners 24. Adjustment of the mass of the suspended assembly can therefore be performed by adding or removing plates, by replacement of heavier plates with lighter plates, or by removal of material from plates already secured in place.

In some circumstances, tuning of a frahm 10 to a particular frequency may be performed once after final assembly of the frahm 10, but then not adjusted thereafter throughout the entire life of the device. In other circumstances, however, it may be desirable to re-tune a frahm 10 after installation on a vehicle. This may be the case, for example, where structural, aerodynamic, or powerplant changes to a vehicle change the harmonics of the vehicle. The design of the embodiment shown in FIGS. 1–4 allows for ready adjustment of the natural frequency in such circumstances.

The design of one embodiment of the suspended frame 20 of FIGS. 1–4 is shown in detail in FIGS. 5–7. As seen in these figures, suspended frame 20 incorporates an upper tuning mass pocket 50 and lower tuning mass pocket 52 connected by a set of tuning mass fastener holes 54. The suspending springs are accommodated by an upper spring pocket 56 and a lower spring pocket 58 at each end of the suspended frame 20. The embodiment shown in FIGS. 5–7 incorporates a spring location bore 60 in the center of each of spring pockets 56 and 58, which is designed to accept and locate a button or cup structure suitable for accepting and locating the end of a spring 32 or 34. It will be appreciated by those of skill in the art that many other geometries could be employed without departing from the spirit and scope of the present invention.

The design of a second embodiment of the present invention is shown in FIG. 8. In a similar manner to that shown for frahm 10 described above, frahm 80 of FIG. 8 incorporates a suspended frame 82, which is suspended by a pair of upper springs 84 and lower springs 86. The entire moving assembly is enclosed within a case 88 having a lid 90. A tuning mass 92 is secured to suspended frame 82 by a set of tuning mass fasteners 94.

Although similar in many respects to frahm 10, frahm 80 is structurally distinct. Whereas frahm 10 is designed for applications where it is desirable to minimize the device dimensions along the axis of operation so as to create a thin form factor, frahm 80 is designed for applications wherein the desired form factor is closer to a cube. Accordingly, the overall length of the device in the principal dimension is proportionally smaller, while the height along the axis of operation is proportionally larger. This is partially necessitated by the addition of mass at the end of the springs 84 and 86 to compensate by the loss of mass in the area between the springs 84 and 86 in the lengthwise direction.

Whereas the invention has been shown and described in connection with the preferred embodiment thereof, it will be understood that many modifications, substitutions and additions may be made which are within the intended broad scope of the appended claims. There has therefore been shown and described an improved trading system which accomplishes at least all of the above stated advantages.

What is claimed is:
1. A vibration cancellation device comprising:
a mass
having a center of mass,
having an axis of motion,
having a central plane passing through the center of mass and orthogonal to the axis of motion,
having a first set of two substantially planar surfaces substantially orthogonal to the axis of motion and facing in a first direction toward the central plane, and
having a second set of two substantially planar surfaces substantially orthogonal to the axis of motion and facing in a second direction substantially opposite the first direction;
a first set of two compression springs acting on the mass through the first set of surfaces; and
a second set two compression of springs acting on the mass through the first set of surfaces; and
wherein the mass is completely suspended by the first and second sets of compression springs.
2. The device of claim 1 wherein the first and second sets of springs are coil springs.
3. The device of claim 1 further comprising a set of tuning masses.
4. A vibration cancellation device comprising:
a mass
having a center of mass,
having an axis of motion,
having a central plane passing through the center of mass and orthogonal to the axis of motion,
having a first set of two mounting features disposed on a first set of surfaces facing in a first direction toward the central plane of the mass, and
having a second set of two mounting features disposed on a second set of surfaces facing in a second direction substantially opposite the first direction;
a first set of two coil springs acting on the mass through the first set of two mounting features; and
a second set of two coil springs acting on the mass through the second set of two mounting features; and
wherein the mass is completely suspended by the first and second sets of coil springs.
5. The device of claim 4 wherein the first and second sets of springs are compression springs.
6. The device of claim 4 wherein the first and second sets of springs are extension springs.
7. The device of claim 4 further comprising a set of tuning masses.
8. A vibration cancellation device comprising:
a mass
having a center of mass,
having an axis of motion,
having a first central plane passing through the center of mass and orthogonal to the axis of motion,
having a second central plane passing through the center of mass and orthogonal to the first central plane and having a first and second side, and
having a third central plane passing through the center of mass and orthogonal to the first and second central planes and having a first and second side;
a first spring having a central axis substantially parallel to the axis of motion and disposed on the first side of the second central plane and the first side of the third central plane;
a second spring having a central axis substantially parallel to the axis of motion and disposed on the first side of the second central plane and the second side of the third central plane;
a third spring having a central axis substantially parallel to the axis of motion and disposed on the second side of the second central plane and the first side of the third central plane;
a fourth spring having a central axis substantially parallel to the axis of motion and disposed on the second side of the second central plane and the second side of the third central plane;

wherein the first and third springs compress and extend together; and wherein the second and fourth springs compress and extend together and in opposition to the first and third springs; and wherein the mass is completely suspended by the first, second, third, and fourth springs.

9. The device of claim 8 wherein the device further comprises a set of tuning masses.

10. The device of claim 9 wherein the tuning masses comprise metal plates.

11. The device of claim 9 wherein the tuning masses are retained by one or more threaded fasteners.

12. The device of claim 9 wherein the device further comprises a case having a window disposed therein for installing and removing tuning masses as desired.

13. The device of claim 8 wherein the springs are coil springs.

14. The device of claim 8 wherein the springs are compression springs.

15. The device of claim 8 wherein the springs are extension springs.

16. A vibration cancellation device comprising:

a frame
- having an axis of motion,
- having a first set of two spring pockets shaped and disposed to accept and retain a first set of two springs along a first set of two spring axes parallel to the axis of motion, and
- having a second set of two spring pockets, facing opposite the first set of two spring pockets and shaped and disposed to accept and retain a second set of two springs along a second set of two spring axes parallel to the axis of motion;

a first set of two springs disposed within the first set of two spring pockets; and a second set of two springs disposed within the second set of two spring pockets;

wherein the first set of two spring axes and the second set of two spring axes are not coincident.

* * * * *